United States Patent [19]

Kawagishi

[11] Patent Number: 5,408,423
[45] Date of Patent: Apr. 18, 1995

[54] BATTERY OPERATED PORTABLE TERMINAL DEVICE AND METHOD OF OPERATION

[75] Inventor: Toshiyuki Kawagishi, Tokyo, Japan

[73] Assignee: Kabushiki Kaisha Toshiba, Kawasaki, Japan

[21] Appl. No.: 80,531

[22] Filed: Jun. 24, 1993

[30] Foreign Application Priority Data

Jun. 26, 1992 [JP] Japan .................................. 4-168710

[51] Int. Cl.⁶ ............................................... G06F 1/32
[52] U.S. Cl. ................................................. 364/707
[58] Field of Search ....................................... 364/707

[56] References Cited

U.S. PATENT DOCUMENTS

| | | | |
|---|---|---|---|
| 4,907,183 | 3/1990 | Tanaka | 364/707 |
| 4,984,185 | 1/1991 | Saito | 364/707 |
| 5,021,983 | 6/1991 | Nguyen et al. | 364/707 |
| 5,083,266 | 1/1992 | Watanabe | 364/707 |
| 5,175,845 | 12/1992 | Little | 364/707 |
| 5,283,906 | 2/1994 | Chen | 364/707 |

*Primary Examiner*—David H. Malzahn
*Attorney, Agent, or Firm*—Cushman, Darby & Cushman

[57] ABSTRACT

A system for reducing power consumption in a battery powered terminal device is provided. The device includes a keyboard for inputting data to the terminal device. A processor is arranged for processing the data input by the keyboard. A System program suspends operation of the terminal when the data is not inputted by the keyboard. A Battery supplies power to the terminal device components. A timer is provided for counting a predetermined number of clock cycles from when the processor is suspended, and generating an interrupt signal to activate the processor when the predetermined number of clock cycles has elapsed. The system program generates data indicative of a battery power failure when the battery power drops below a certain value after the processor is activated by the timer. A switch suspends the battery power supply of the battery when the data is generated by the system program.

13 Claims, 5 Drawing Sheets

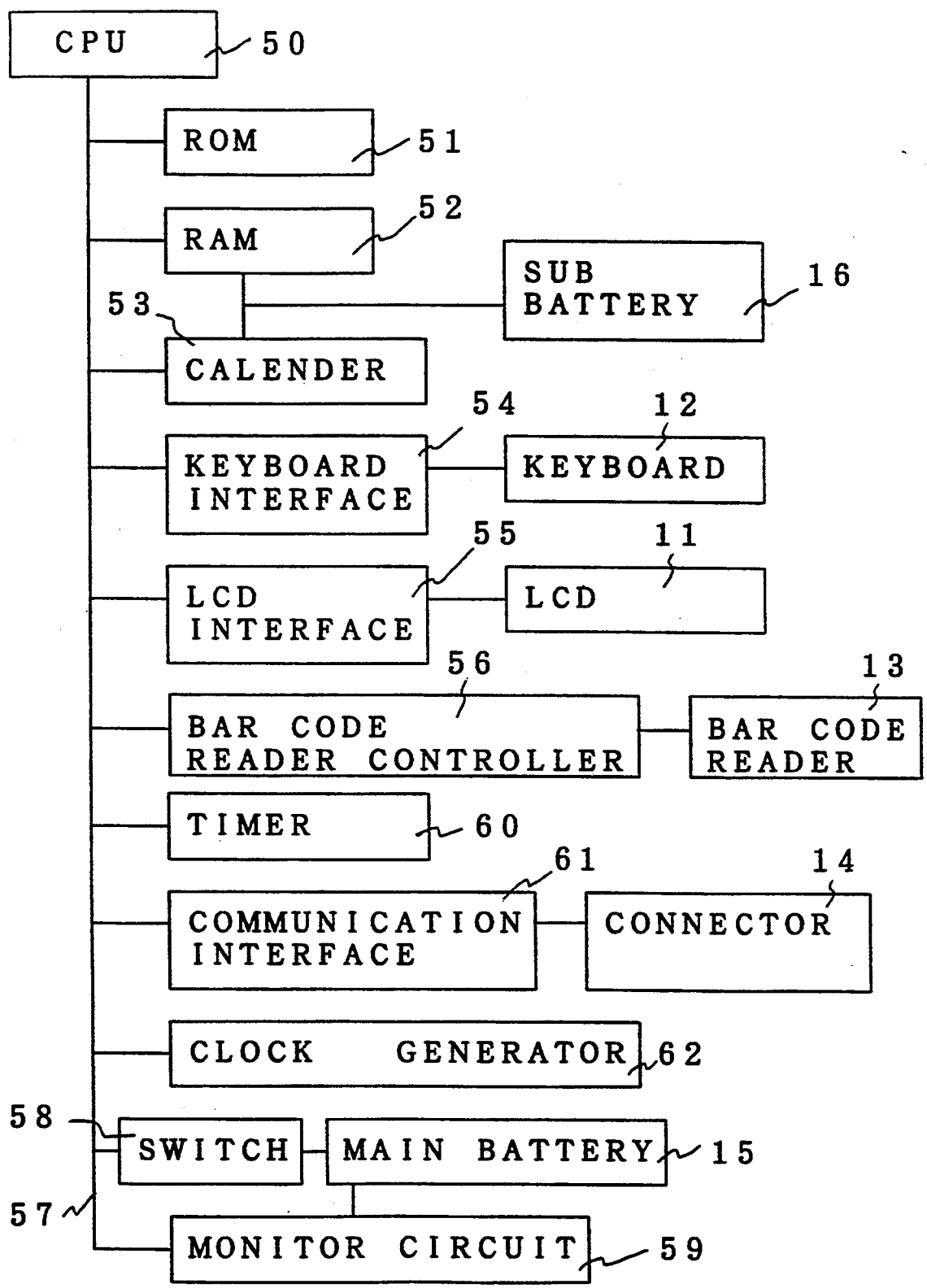
F I G. 2

BATTERY OPERATED PORTABLE TERMINAL DEVICE AND METHOD OF OPERATION

BACKGROUND OF THE INVENTION

1. Field of the Invention

The present invention relates to a portable terminal device and method of operation, and more particularly to a portable terminal device which is driven by batteries.

2. Description of the Related Art

Many types of battery driven portable terminal devices have been developed and used in fields such as finance, traffic, and the like. These portable terminal devices have a central processing unit (CPU), a display device, a keyboard, a memory, and a battery pack. The battery pack provides a predetermined amount of power to each component within the portable terminal device.

Due to the need for lightweight portable terminal device, lightweight battery pack which provide only a few hours of continuous operation on a given charge must be used within them. If the battery power of these battery packs falls below a certain threshold power value, both buffered and processing data can be lost. For this reason, it is advantageous to provide a monitoring system for this portable terminal device power, insuring that no buffered or processed data is lost due to power failures.

A device for preventing unintentional loss of data in a terminal device due to electrical power failure is disclosed in U.S. Pat. No. 4,763,333. This device comprises a main power battery, a continuously powered memory, and a monitor circuit for generating signals during battery power failure.

A ROM is provided which executes stored programs during power failure. These stored programs take over control of the terminal device and store the current state of the CPU in the continuously powered memory.

Note that in this device, a power failure is detected via status signals which are sent from the monitor circuit during a routine and periodic check of the battery. Thus, in this conventional device, the battery power consumption is increased by the system used to check it.

SUMMARY OF THE INVENTION

Accordingly, it is an object of the present invention to provide a system and method of operation for a terminal device which consumes less battery power than the conventional art.

In this invention, manually input data is processed by a processor. When an application program requires manual input and no such input is avaiable, the present invention causes processing to be suspended for a predetermined period of time. After this predetermined period, the processor is reactivated, and its first operation is to check the state of the power level. If the power level has dropped below a predetermined value, a unique code is stored. However, if the power level is not below the predetermined level, the manual input is stored.

The application program then check memory for manually input data or a low power code. As before, the absence of either will cause the processing to be suspended for a predetermined period of time. However, the presence of manually input data leads to processing of that data, and the presence of uniqe code will cause a message indicating power failure to be displayed, the current state of processing to be saved, and operation of the terminal to be suspended.

Thus, this system and method achieves lower power consumption than the conventional art by monotoring the battery power level only when directed by input request.

BRIEF DESCRIPTION OF THE DRAWINGS

FIG. 2 is a block diagram showing the device shown in FIG. 1;

DETAILED DESCRIPTION OF THE PRESENTLY PREFERRED EXEMPLARY EMBODIMENT

Figure 1A:
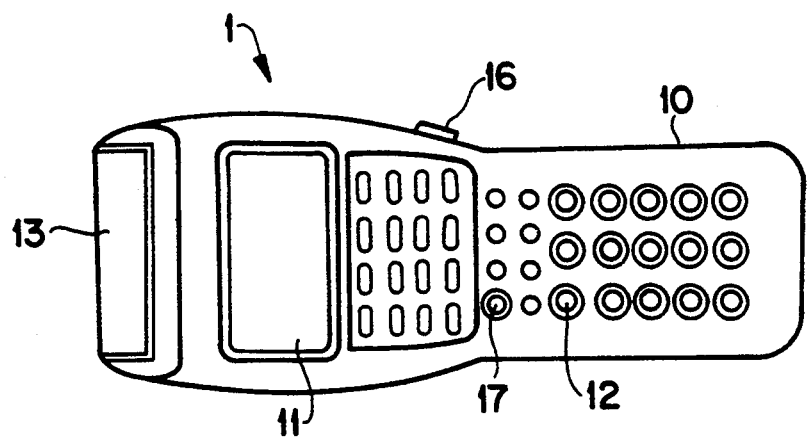
FIG. 1A is a front view of a portable electronic device according to an embodiment of the present invention.
Figure 1B:
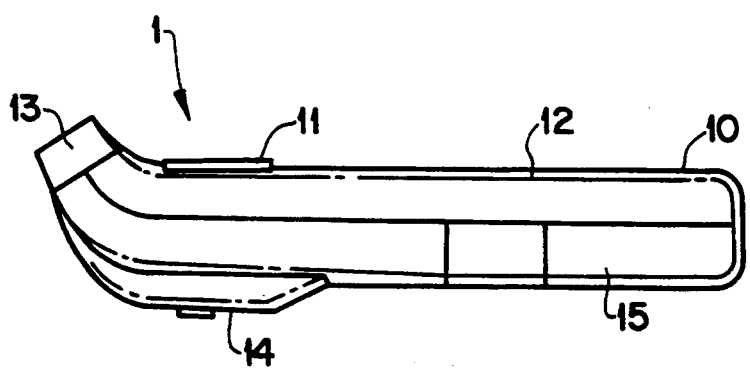
FIG. 1B is a side view of the device shown in FIG. 1A.
Figure 1C:
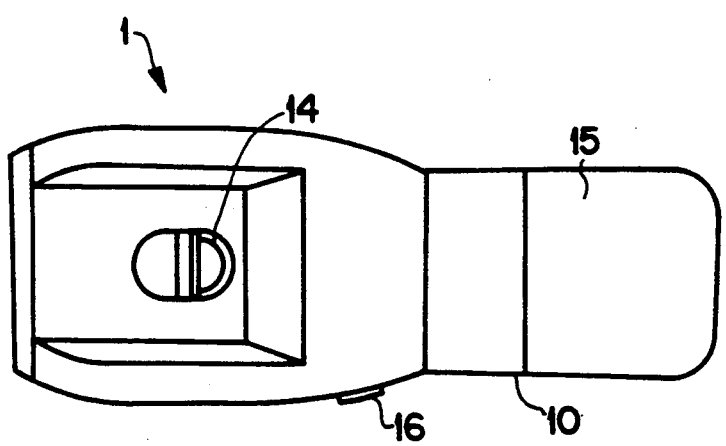
FIG. 1C is a back view of the device shown in FIG. 1A.

An embodiment of the present invention applied to a portable terminal device will now be described in detail with reference to the accompanying drawings. FIGS. 1A, 1B and 1C show three views of a portable terminal device 1 according to this embodiment.

FIGS. 1A–1C shows device 1 which has a main body 10 upon which liquid crystal display (LCD) 11 and keyboard 12 are arranged on the front side. Main body 10 also contains bar code reader 13 on its top portion for reading a bar code, and interface connector 14 at its back side for achieving data communication with external device and downloading application programs. Main and sub batteries 15,16 are respectively provided on the lower and side portion of main body 10, with main battery 15 being removable from main body 10.

A circuit of the portable terminal device 1, shown in FIG. 2, comprises a central processing unit (CPU) 50, a read only memory (ROM) 51, a random access memory (RAM) 52, a calendar unit 53, a keyboard interface 54, a liquid crystal display (LCD) interface 55, and a bar code reader controller 56, all of which are connected to one another via bus line 57.

Bus line 57 is also connected to the main battery 15 by switch 58. Switch 58 is opened or closed by operating a power key 17. When the power key 17 is depressed, main battery 15 provides a predetermined voltage across each of the units connected to bus line 57.

Also connected to bus line 57 are monitor circuit 59, internal timer 60, communication interface 61 and clock generator 62. Monitor circuit 59 generates a signal when the output voltage of main battery 15 drops below a predetermined minimum threshold value. Clock generator 62 provides the system clock for the control section of the portable terminal device circuit. Internal timer 60 counts the number of clock ticks after any halt in CPU 50 and outputs hardware interrupt signals after reaching a predetermined delay count. Communication interface 61 is used to download application programs into the RAM 52 via connector 14.

Keyboard 12 and LCD 11 are connected to their respective interfaces 54 and 55, and bar code reader 13 is connected to bar code reader controller 56.

ROM 51 stores an operating system program for controlling the entire control section, as well as basic Input/Output software (BIOS) for controlling the input and output operations of the computer. Similarly, RAM 52 stores an application program which is developed in an external personal computer or the like and downloaded via communication interface 61 and associated connector 14.

Therefore, in this device, the CPU 50 is driven by an operating system program stored in ROM 51, while it execute an application program stored in RAM 52.

The above-mentioned BIOS is a software interface, or layer, which provides the programmer more detailed control over hardware device than that provided through the operating system program alone. Hence, BIOS is the hardware-dependent part of the computer's operating system.

The BIOS includes a Key Get Routine which used to obtain a key code from keyboard interface 54 during keyboard operation. This Key Get Routine is called by the system program whenever a GETCH (GET CHARACTER) command is provided from the application program.

The BIOS further includes a plurality of interrupt routines such as a hardware interrupt routine and a timer interrupt routine.

The hardware interrupt routine activates CPU 50 from a HALT state according to a hardware interrupt signal as follows. When keyboard 12 is operated, keyboard interface 54 provides an interrupt signal to CPU 50. Upon receipt of the interrupt signal, CPU 50 invokes the Key Get Routine through the system program, thereby obtain a key code from keyboard interface 54.

The timer interrupt routine periodically activates CPU 50 according to the timer interrupt signal of timer 60. This signal is generated when a predetermined number of clock cycles have passed after CPU 50 has been halted. Once CPU 50 is activated by this interrupt, it functions as normal, updating and checking all hardware device.

Figure 3:
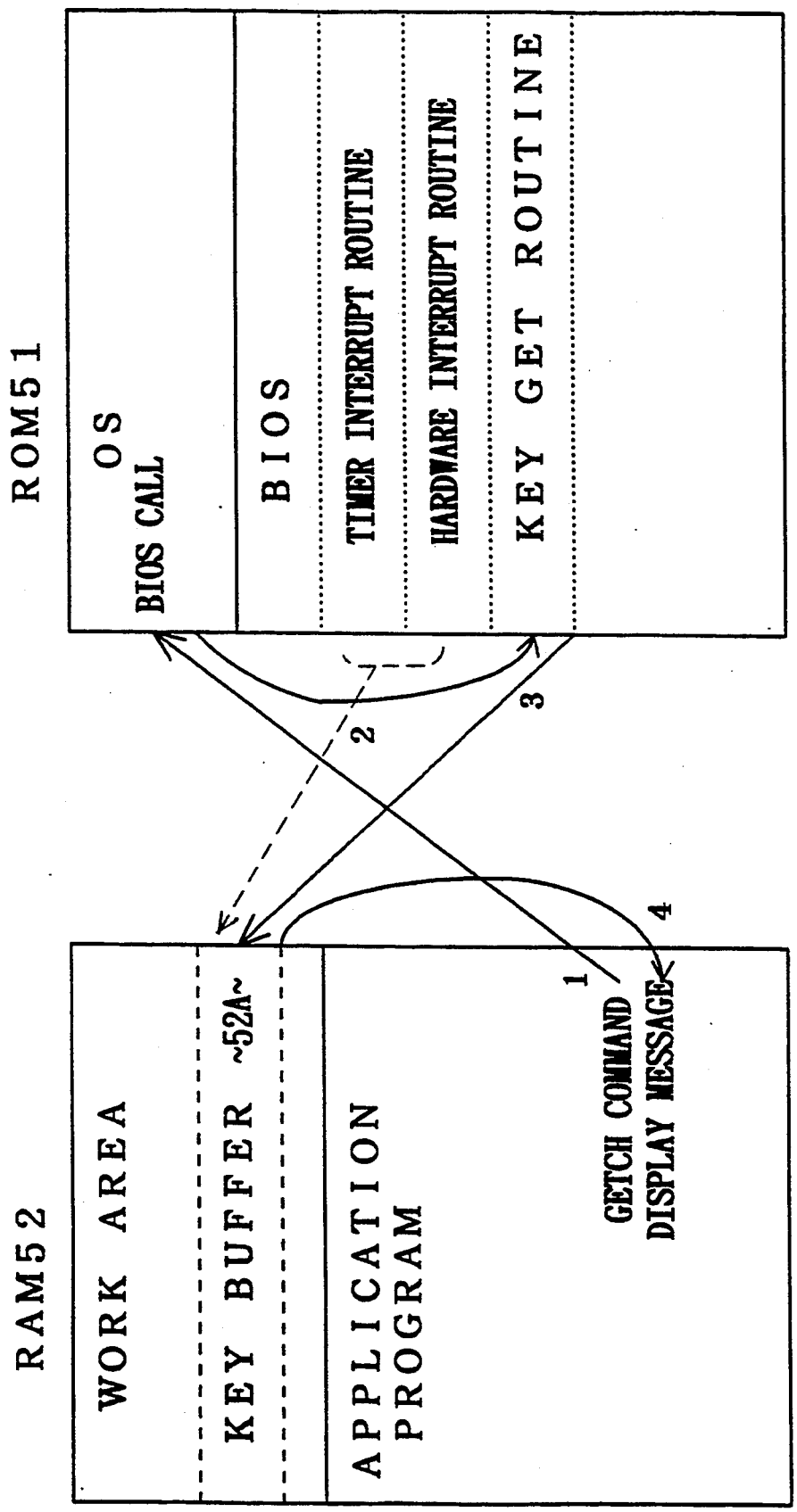
FIG. 3 is a high level flow chart showing the allocation of control between an operating system program and an application program.

FIG. 3 shows a high level operation of the present invention. When the Key Get Routine of the BIOS is activated through the GETCH command, the application program invoking it is waiting for a keyboard input. In this state, if keyboard 12 is operated, a key code is stored in a key buffer area 52A of the RAM 52. Further, monitor circuit 59 may generate a signal indicating power failure of main battery 15 which would cause a unique key code representing power failure to be stored in key buffer area 52A. Thus, if present, a key code corresponding to keyboard input, or the signal corresponding to the monitor circuit power failure, will be stored in key buffer area 52A of the RAM 52. If not present, the buffer will remain empty.

The application program then obtains the key code from key buffer 52A and compares this code to the unique code representing power failure. If a match is detected, the application program directs LCD display device 11 to display a message to the operator, and directs the operating system program to save the corrent state of CPU 50 into RAM 52. Thus, the application program obtains battery status information in response to the GETCH command instead of continually polling for battery status. Therefore, the Key Get Routine shown in FIG. 4 triggers the power status check.

Figure 4:
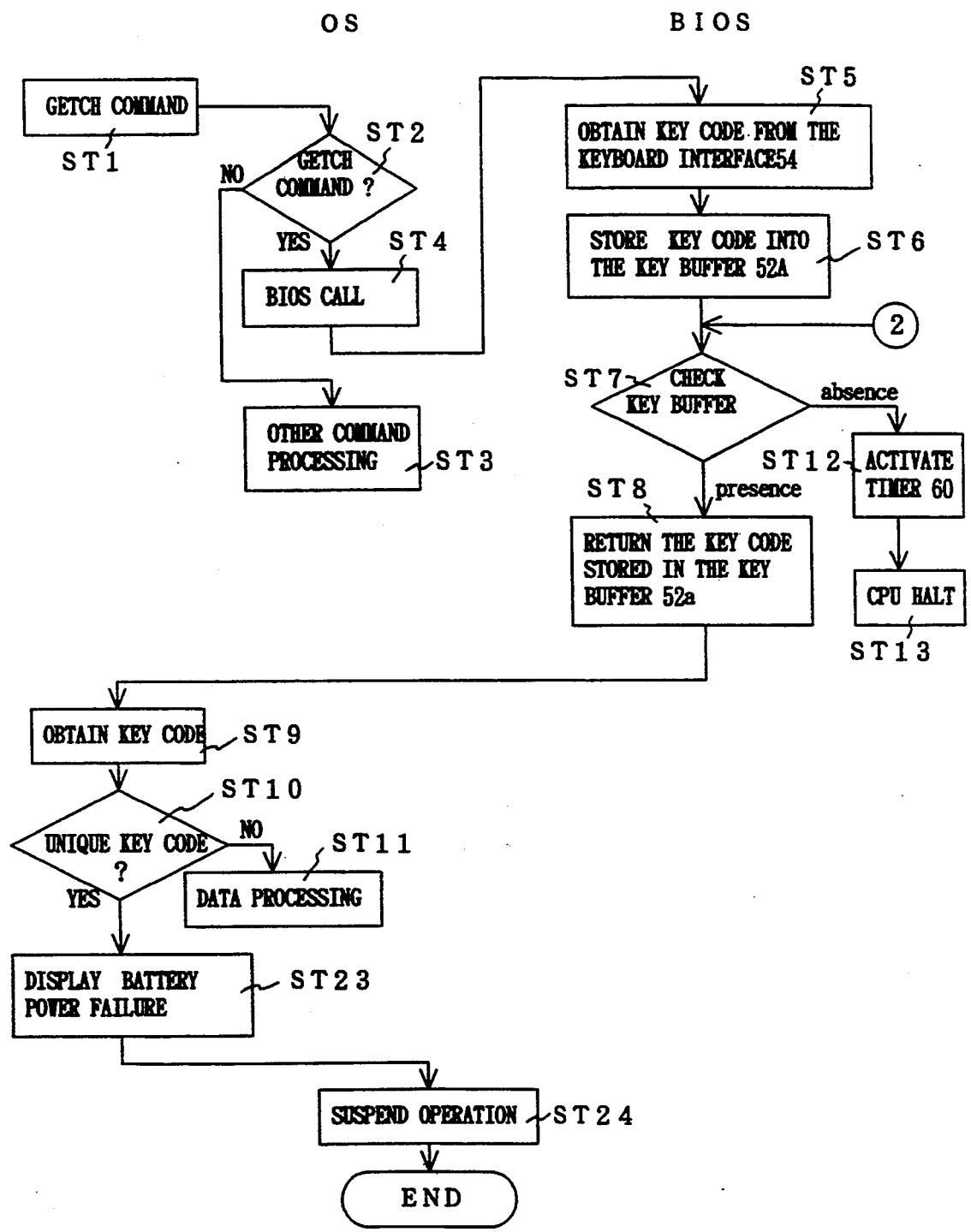
FIG. 4 is a flow chart showing the operation of the present invention.
Figure 5:
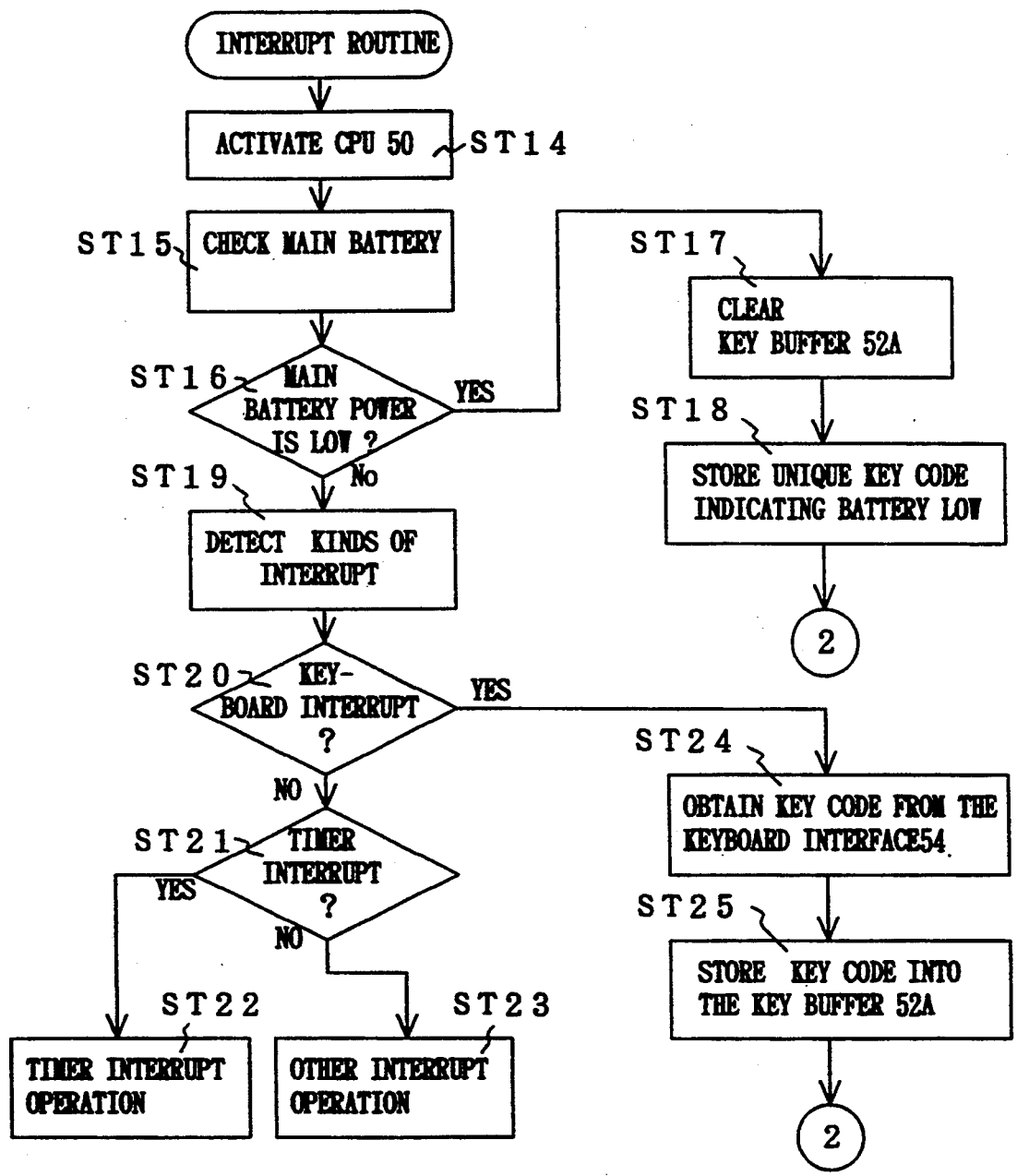
FIG. 5 is a flow chart showing an interrupt operation of the present invention.

The function of the present invention will now be discussed in greater detail as shown in FIGS. 4 and 5.

When a command is provided in the application program (ST1), the command is compared to the GETCH command by CPU 50 (ST2).

When the command to the operating system is not a GETCH command, the operating system program executes other command processes in accordance with the command (ST3).

Alternatively, when the application program requires key operation, it provides a GETCH command to the operating system program. Upon receipt of this GETCH command, operating control is transferred from the application program, through the operating system program, to the BIOS where the Key Get Routine is called into CPU 50 (ST4).

As was described for FIG. 3 the Key Get Routine checks for keyboard operation, obtaining a key code, if available, from keyboard interface 54 (ST5). If a key code is received, it is saved into key buffer 52A (ST6). CPU 50 then checks key buffer 52A (ST7) for a key code.

If a key code is stored in key buffer 52a, the key code is returned to, and obtained by, the application program (ST8 and ST9). The key code is then compared to predetermined unique key code corresponding to battery power failure (ST10). If no match is detected, the application program processes the data as normal (ST11). However, if a unique key code is detected, a message is displayed to the operator indicating battery power failure (ST23), and the operating system program performs suspending operation of the terminal device, saving the current state of CPU 50 to RAM 52 (ST24).

If at step 7 no key code is found in key buffer 52A, timer 60 will be activated by the operating system program (ST12), and CPU 50 will be forced halt state (ST13). During this CPU halt state, the main battery power continues to be supplied to all device on bus line 57 and interrupts shown in FIG. 5 may be used to reactivate CPU 50.

While CPU 50 is in halt state, if timer 60 reaches the predetermined clock cycle count or keyboard 12 is operated, a interrupt is detected. The interrupt will activate CPU 50 (ST14).

CPU 50 checks the status of the main battery (ST15). If the battery voltage is determined to be below a minimum threshold value (ST16), the system program will clear key buffer 52A (ST17) and store a unique key code which represents a battery low state in key buffer 52A (ST18). The operation is then transfered from the interrupt routine to the Key Get Routine at step 7 of FIG. 4 where the unique code is stored in key buffer 52A and returned to the application (ST8).

If the battery voltage is not determined to be below a minimum threshold value (ST16), CPU 50 identifies the interrupt level (ST19). If keyboard 12 is operated, a keyboad interrupt is detected (ST20) and the system program checks for keyboard operation, obtaining a key code from keyboard interface 54 (ST24). If a key code is received, it is saved into key buffer 52A (ST25) and operation is then transfered from the interrupt routine to the Key Get Routine at step 7 of FIG. 4, where the key code is stored in key buffer 52A and returned to the application (ST8).

If a timer interrupt is detected (ST21), the system program performs a timer interrupt operation (ST22).

In the above embodiment, the application program can obtain power status in response to the GETCH command when CPU 50 is activated by a timer interrupt. Thus, CPU 50 need not be continuously operated in order to obtain power status. Therefor, battery power consumption is reduced as CPU 50 can be put into a halt state.

Additional advantages and modifications will readily occur to those skilled in the art. Therefore, the invention, in its broader aspects, is not limited to the specific details, representative device, and illustrated examples shown and described herein. Accordingly, various modifications may be made without the parting from the spirit or scope of the general inventive concept as defined by the appended claims and their equivalence.

What is claimed is:

1. A battery powered terminal device comprising:
   means for receiving data;
   means for processing the received data;
   a battery for supplying power to the battery powered terminal device;
   means for determining if data is received by the receiving means;
   means for halting operation of the processing means when it is determined that data is not received by the receiving means;
   activating means for activating the processing means after operations have been halted for a predetermined period of time;
   power determining means for determining if the battery has less than a predetermined amount of power, said determination being made when the activating means activates the processing means;
   generating means for generating a code indicating power failure when the power determining means determines that the battery has less than a predetermined amount of power; and
   means for saving a current state of the processing means and for suspending the power supply when the code is generated by the generating means indicating power failure.

2. The battery powered terminal device of claim 1, wherein:
   the saving means include a memory for storing the current state of the processing means; and
   the battery includes main and sub batteries, the main battery supplying power to the processing means and the sub battery and the main battery supplying power to the memory so that the sub battery powers the memory when the main battery fails.

3. The battery powered terminal device of claim 1, wherein:
   the generating means include means for saving a unique key code when power is below the certain threshold value; and
   the saving means include means for saving the current state of the processing means when the unique key code corresponding to power failure is detected.

4. The battery powered terminal device of claim 3, further comprising:
   means for displaying a message which indicates battery power failure when the unique code is saved.

5. The battery powered terminal device of claim 1, wherein the activating means include a timer for counting a predetermined number of clock cycles from when the processing means is halted, and for generating an interrupt signal to activate the processing means when the predetermined number of clock cycles has elapsed.

6. A battery powered terminal device having reduced power consumption which comprises:
   receiving means for receiving manually input data;
   means for generating an interrupt upon receipt of the manually input data;
   a buffer for storing codes, where the stored codes include codes corresponding to the input data;
   a central processing unit for processing the codes stored in the buffer;
   battery means for supplying power to the terminal device;
   means for monitoring the battery means when an interrupt is received, for generating a unique code indicating battery power failure when the battery power drops below a certain threshold value and for storing the unique code in the buffer; and
   means for suspending operations of the terminal device when the unique code is stored in the buffer.

7. A battery powered terminal device having reduced power consumption which comprises:
   receiving means for receiving manually input data;
   means for generating an interrupt upon receipt of the manually input data;
   a buffer for storing codes, where the stored codes include codes corresponding to the input data;
   a central processing unit for processing the codes stored in the buffer;
   battery means for supplying power to the terminal device;
   means for determining if an input code is stored in the buffer;
   means for halting operation of the central processing unit when no input code is stored in the buffer;
   means for activating the central processing unit after a predetermined interval from a halt in the central processing unit, the generating means generating the unique code after the central processing unit is activated by the activating means;
   means for monitoring the battery means when an interrupt is received, for generating a unique code indicating battery power failure when the battery power drops below a certain threshold value and for storing the unique code in the buffer; and
   means for suspending operations of the terminal device when the unique code is stored in the buffer.

8. A method for reducing power consumption in a battery powered terminal device comprising the steps of:
   monitoring an application program for receipt of a command requesting input;
   receiving an input code from an input device and storing the input code in a memory upon receipt of the command from the application program;
   generating an interrupt upon receipt of an input code;
   non-continuously monitoring for a power failure, generating a unique code in response to a power failure and storing the unique code in the memory when an interrupt routine is invoked;
   determining if the contents of the memory correspond to the unique key code; and
   suspending operation of the terminal when the contents of the memory correspond to the unique code.

9. The method of reducing power consumption in the portable terminal device as in claim 8, further comprising the following steps:
   processing the contents of memory;

halting processing when no input code is received from the input device; and activating processing after a certain specified period of time.

10. The method of reducing power consumption in the portable terminal device as in claim 8, further comprising the step of processing the contents of memory when the memory does not contain the unique code.

11. A method of reducing power consumption in a battery powered terminal device comprising the steps of:

inputting data to the terminal device;

processing the data input;

supplying power to terminal device component with a power supply;

determining if data is input;

halting the processing when no data is input;

activating the processing after it has been suspended for a predetermined period of time;

generating a code which indicates power failure when the power supply is below a certain threshold value, the code being generated after the activating step activates processing;

saving a current state of processing when data is generated indicating power failure; and suspending operation of the terminal device when data indicating power failure is generated.

12. The method of power reduction of claim 11, where the code indicating power failure is a unique code, and where the method further comprising the steps of:

storing said unique key code corresponding to power failure; and storing the current state of processing when said unique key code corresponding to power failure is stored.

13. The method of power reduction of claim 12, further comprising the steps of:

displaying a message indicating battery power failure when the unique code is stored.

* * * * *